United States Patent
Fan et al.

(10) Patent No.: US 12,521,589 B2
(45) Date of Patent: Jan. 13, 2026

(54) FITNESS DEVICE USING TWO MOTORS FOR OFFSETTING SHAKES

(71) Applicant: DONGGUAN DIRECT DRIVE TECHNOLOGY LIMITED, Dongguan (CN)

(72) Inventors: Yulong Fan, Dongguan (CN); Yanan Yu, Dongguan (CN); Ying Liu, Dongguan (CN); Zhiming Zhong, Dongguan (CN)

(73) Assignee: DONGGUAN DIRECT DRIVE TECHNOLOGY LIMITED, Dongguan (CN)

( * ) Notice: Subject to any disclaimer, the term of this patent is extended or adjusted under 35 U.S.C. 154(b) by 100 days.

(21) Appl. No.: 18/403,755

(22) Filed: Jan. 4, 2024

(65) Prior Publication Data

US 2024/0131380 A1 Apr. 25, 2024
US 2024/0226635 A9 Jul. 11, 2024

Related U.S. Application Data

(63) Continuation of application No. PCT/CN2021/139836, filed on Dec. 21, 2021.

(30) Foreign Application Priority Data

Jul. 5, 2021 (CN) .......................... 202110758317.1

(51) Int. Cl.
*A63B 21/005* (2006.01)
*A63B 21/00* (2006.01)
(Continued)

(52) U.S. Cl.
CPC ........ *A63B 21/0058* (2013.01); *A63B 21/153* (2013.01); *A63B 24/0062* (2013.01);
(Continued)

(58) Field of Classification Search
CPC .............. A63B 21/0058; A63B 21/153; A63B 24/0062; A63B 2024/0093;
(Continued)

(56) References Cited

U.S. PATENT DOCUMENTS

2013/0267384 A1 10/2013 Eldridge
2014/0194250 A1 7/2014 Reich
(Continued)

FOREIGN PATENT DOCUMENTS

CN 105498151 A 4/2016
CN 108379782 A 8/2018
(Continued)

OTHER PUBLICATIONS

The extended European Search Report of EP patent application No. 21949155.2 issued on Nov. 12, 2024.
(Continued)

*Primary Examiner* — Sundhara M Ganesan
(74) *Attorney, Agent, or Firm* — Andrew C. Cheng

(57) ABSTRACT

A fitness device includes two support frames mounted in a box, two driving motors mounted on the two support frames, a pull rope reel connected to the driving motors, a fitness pull rope wound around the pull rope reel and extending out of the box, and a control system for controlling the driving motors. The control system includes a main controller, a power module, a communication module connected to the main controller, a driving circuit and a sampling module electrically connected to the driving motors and the main controller. The power module is electrically connected to the main controller and the communication module. The driving circuit is electrically connected to the power module, the main controller and the driving motors. The two symmetrical driving motors are used to drive the pull rope reel to drive the fitness pull rope, such that shakes and vibrations generated during exercise can be offset.

10 Claims, 11 Drawing Sheets

(51) Int. Cl.
*A63B 24/00* (2006.01)
*A63B 71/06* (2006.01)
*H02K 7/14* (2006.01)

(52) U.S. Cl.
CPC ........ *H02K 7/14* (2013.01); *A63B 2024/0093* (2013.01); *A63B 2071/0675* (2013.01)

(58) Field of Classification Search
CPC ...... A63B 2071/0675; A63B 2071/009; A63B 2220/51; A63B 2220/833; A63B 2225/50; A63B 21/4035; A63B 21/0059; A63B 21/005; A63B 21/4033; A63B 23/12; A63B 71/0054; A63B 2071/0063; H02K 7/14; H02K 7/1008; H02K 11/27; H02K 11/33; H02K 11/0094; H02K 7/10; H02P 27/06; H02P 5/74; Y10S 388/9075
See application file for complete search history.

(56) References Cited

U.S. PATENT DOCUMENTS

| | | | |
|---|---|---|---|
| 2017/0196752 A1* | 7/2017 | Behnke | A61H 3/008 |
| 2019/0001184 A1* | 1/2019 | Schindler-Ivens | A63B 21/0058 |
| 2020/0222266 A1* | 7/2020 | Gordon | A61H 3/008 |
| 2020/0298062 A1* | 9/2020 | Gilstrom | H02J 7/34 |
| 2021/0008402 A1* | 1/2021 | Orady | A63B 71/0054 |
| 2021/0128978 A1 | 5/2021 | Gilstrom | |
| 2021/0394011 A1* | 12/2021 | Neuhaus | A63B 71/0622 |
| 2022/0105378 A1* | 4/2022 | Chiavegato | A63B 21/154 |
| 2022/0184452 A1* | 6/2022 | Valente | A63B 21/4033 |

FOREIGN PATENT DOCUMENTS

| | | |
|---|---|---|
| CN | 113332661 A | 9/2021 |
| EP | 3299070 A1 | 3/2018 |
| GB | 2562486 A | 11/2018 |
| JP | 07-013358 U | 3/1995 |
| JP | 2005-295740 A | 10/2005 |
| JP | 2012-165521 A | 8/2012 |
| WO | 2021046596 A1 | 3/2021 |

OTHER PUBLICATIONS

The Office Action of JP patent application No. 2023-580847 issued on Oct. 1, 2024.
International Search Report of PCT application No. PCT/CN2021/139836 issued on Apr. 8, 2022.
Search Report of CN application No. 202110758317.1 issued on Mar. 10, 2022.
The Office Action of KR patent application No. 10-2024-7002686 issued on Jul. 1, 2025.

* cited by examiner

FITNESS DEVICE USING TWO MOTORS FOR OFFSETTING SHAKES

CROSS-REFERENCE OF RELATED APPLICATION

The application claims priority to Chinese Patent Application No. 202110758317.1, entitled "Fitness Device Using Two Motors for Offsetting Shakes", filed with the China National Intellectual Administration on Jul. 5, 2021, which is incorporated herein by reference in its entirety.

TECHNICAL FIELD

The invention relates to the technical field of smart fitness, in particular to a fitness device using two motors for offsetting shakes.

BACKGROUND

The improvement of people's living standard leads to gradual integration of cleaning robots into people's home life. Existing cleaning robots use a brush motor as the power source, a reduction box is used as a drive unit between the brush motor and separately arranged tires to reduce speed and increase force to provide power for travelling of the cleaning robots. With the development of the times and the progress of the society, people pay more and more attention to their physical health, so fitness devices are becoming more and more popular. Doing fitness exercise can improve the mood, resist chromic diseases, control the body weight, strengthen the cardio-pulmonary function, and promote better sleep.

However, with the rapid pace of life and the increase of people's life pressure, most people have a tight daily schedule, are very busy, and do not have enough time for fitness exercise at ordinary times, and when they want to do exercise in vacation or leisure time, it may be hindered due to field limitations and other factors. At present, there are a wide variety of fitness devices with different functions on the market. Pull exercise is simple, thus being widely popularized. Pull fitness devices for healthcare still need to be improved. Traditional force-adjustable pull fitness devices are heavy and occupy a large area. The pull force of small and light pull-up bars cannot be changed, which is not beneficial to exercise of users.

SUMMARY

Technical Solution

The objective of the invention is to solve the above technical problems by providing a fitness device using two motors for offsetting shakes, which has a fitness pull rope arranged on driving motors functioning as pull drivers and adopts a control system to control the pull force of the driving motors to realize smart fitness.

The above objective can be fulfilled through following technical solution:

A fitness device using two motors for offsetting shakes, comprises a box, two support frames symmetrically mounted in the box, two driving motors mounted on the two support frames and arranged opposite to each other, a pull rope reel connected to the two driving motors, a fitness pull rope wound around the pull rope reel and extending out of the box, and a control system electrically connected to and used for controlling the driving motors. The control system comprises a main controller, a power module, a communication module, a driving circuit and a sampling module. The power module is electrically connected to the main controller and the communication module, the communication module is electrically connected to the main controller, the sampling module is electrically connected to the driving motors and the main controller, and the driving circuit is electrically connected to the power module, the main controller and the driving motors.

Details of one or more embodiments of the invention are presented in the following drawings and description. Other features, objectives and advantages of the invention will become obvious in the specification, drawings and claims.

Compared with traditional fitness devices, the fitness device provided by the invention is a pull fitness device, which has a fitness pull rope arranged on driving motors functioning as pull drivers and adopts a control system to control the pull force of the driving motors, thus realizing smart fitness. In addition, two symmetrical driving motors are used to drive a pull rope reel to drive the fitness pull rope, such that shakes and vibrations generated during exercise can be offset, the load of each motor is reduced, the stability is improved, the overall structure is reliable, and the service life is long. During the control process, the control system receives an input corresponding pull force instruction through a communication module, a main controller outputs a corresponding program to a driving circuit through a control algorithm after acquiring the instruction, the driving circuit controls on/off of three-phase currents of the driving motors, and then a sampling module continuously compares sampled currents of the driving motors with the input instruction and adjusts the currents continuously until the pull force output by the driving motors reaches the value in the input instruction, such that the pull force can be adjusted freely. Specifically, the fitness device comprises a box, two support frames symmetrically mounted in the box, two driving motors mounted on the two support frames and arranged opposite to each other, a pull rope reel connected to the two driving motors, a fitness pull rope wound around the pull rope reel and extending out of the box, and a control system electrically connected to and used for controlling the driving motors; and the control system comprises a main controller, a power module, a communication module, a driving circuit and a sampling module, the power module is electrically connected to the main controller and the communication module, the communication module is electrically connected to the main controller, the sampling module is electrically connected to the driving motors and the main controller, and the driving circuit is electrically connected to the power module, the main controller and the driving motors. The two support frames and the two driving motors are used to fix the pull rope reel, and intelligent control of the motors is realized under intelligent control of the control system, such that the intelligent level is high.

BRIEF DESCRIPTION OF THE DRAWINGS

Embodiments and/or examples of the invention disclosed here can be better described and explained with reference to one or more drawings. Additional details or examples for describing the drawings should not be construed as limitations of any one of the invention disclosed, currently described embodiments and/or examples, and currently appreciated optimal modes of the invention.

In the drawings.

Reference signs: 1, box; 11, support frame; 111, top plate; 112, fixing plate; 12, control panel; 2, driving motor; 21, base; 211, internal end; 211a, mounting stand; 211b, gap; 212, external end; 213, rotary mounting cavity; 22, stator assembly; 221, iron core; 222, coil; 223, tooth; 23, rotary shaft assembly; 231, bearing assembly; 232, rotary shaft; 233, fixing element; 24, rotor assembly; 241, outer end cover; 241a, reinforcing stand; 241b, pull rope reel; 242, connecting ring; 243, rotor element; 244, inner end cover; 25, motor control plate; 3, pull rope reel; 31, fitness pull rope; 32, grip ring.

DESCRIPTION OF THE EMBODIMENTS

For facilitating understanding of the invention, the invention will be described more comprehensively below with reference to related drawings. The drawings illustrate preferred embodiments of the invention. However, the invention can be implemented in many different forms, and is not limited to the embodiments described in the specification. On the contrary, these embodiments are provided for a more thorough and comprehensive understanding of the disclosure of the invention.

It should be noted that when one element is referred to as being "fixed to" the other element, it may be directly fixed to the other element or there may be another element between the two elements. When one element is referred to as being "connected to" the other element, it may be directly connected to the other element or there may be another element between the two elements.

Unless otherwise defined, all technical and scientific terms used in the specification have the same meanings as commonly understood by those skilled in the art. The terms used in the specification of the invention are merely for the purpose of describing specific embodiments of the invention and are not intended to limit the invention.

Figure 1:
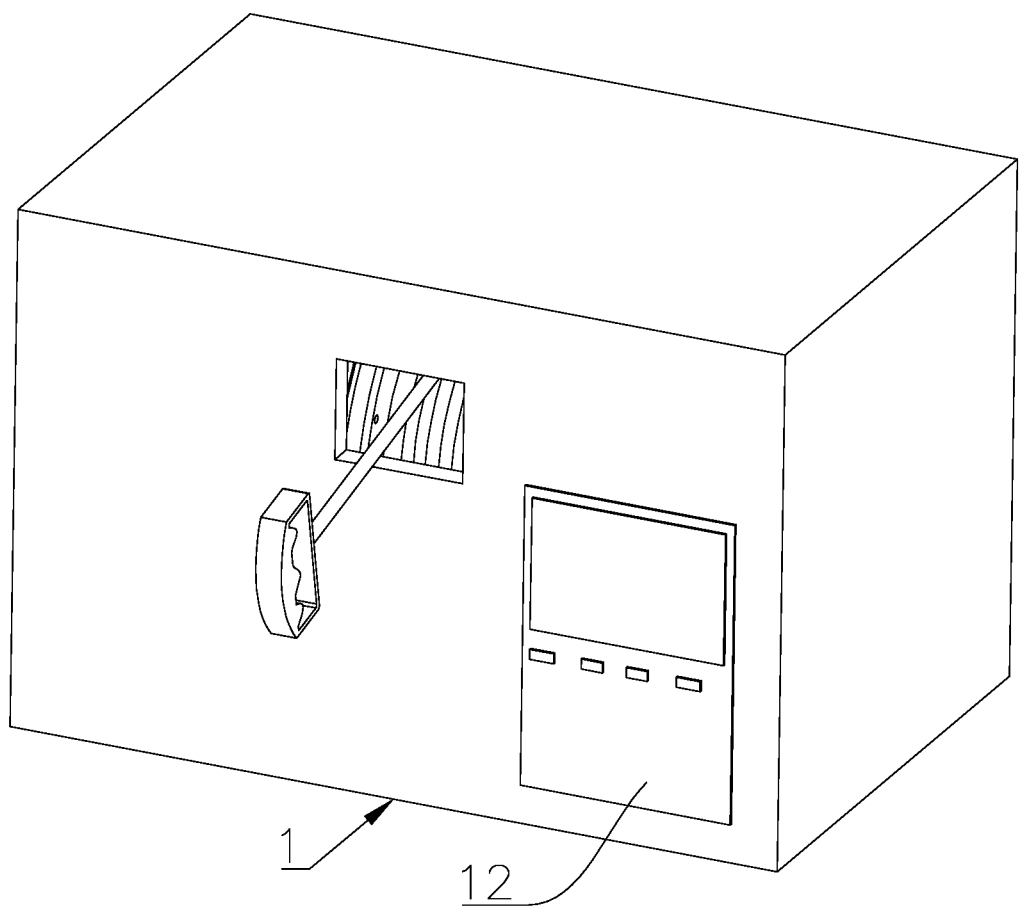
FIG. 1 is a schematic perspective view of a fitness device according to the invention.
Figure 2:
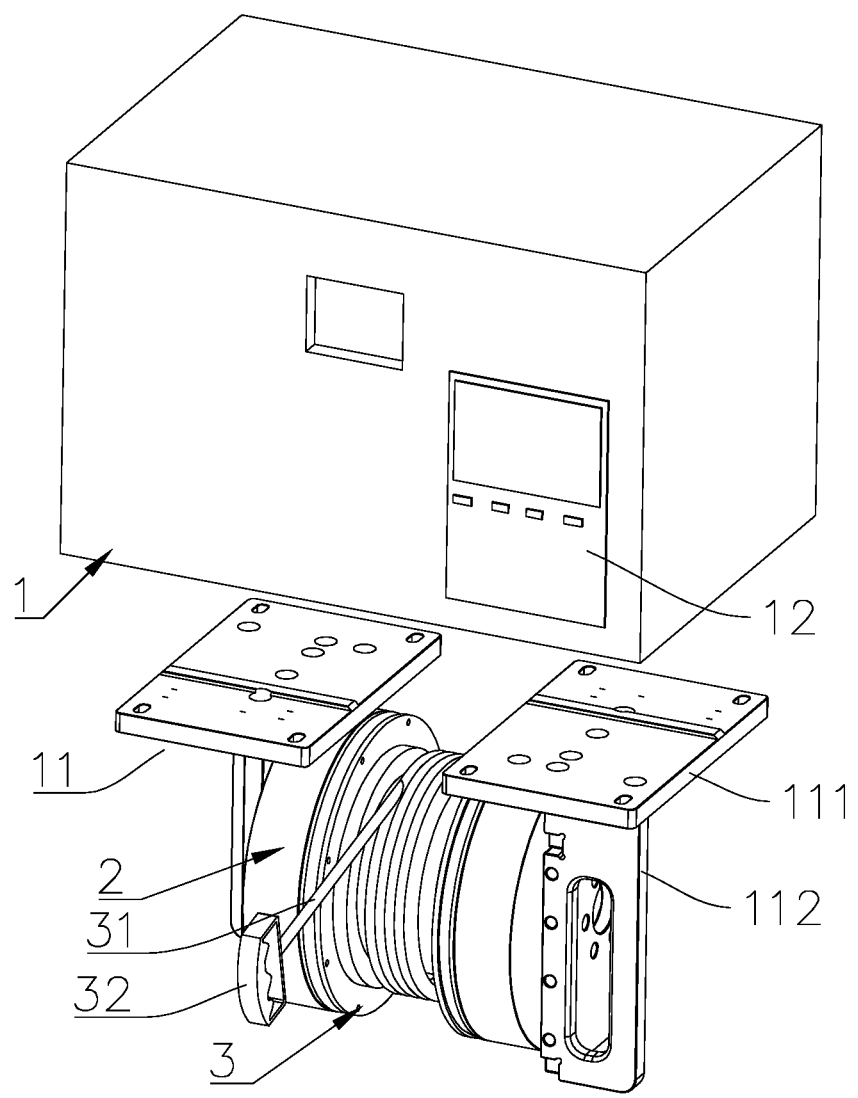
FIG. 2 is an exploded view of the fitness device in FIG. 1.
Figure 3:
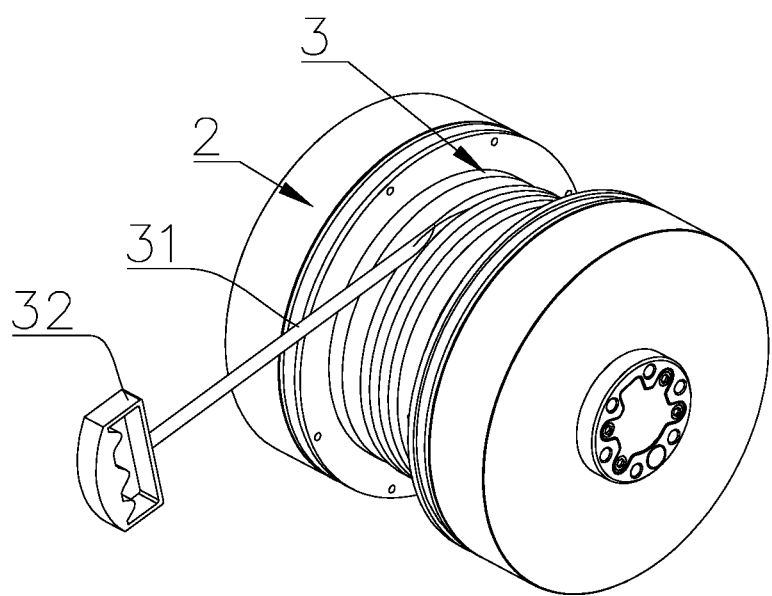
FIG. 3 illustrates a driving motor and a fitness pull rope of the fitness device in FIG. 2.
Figure 4:
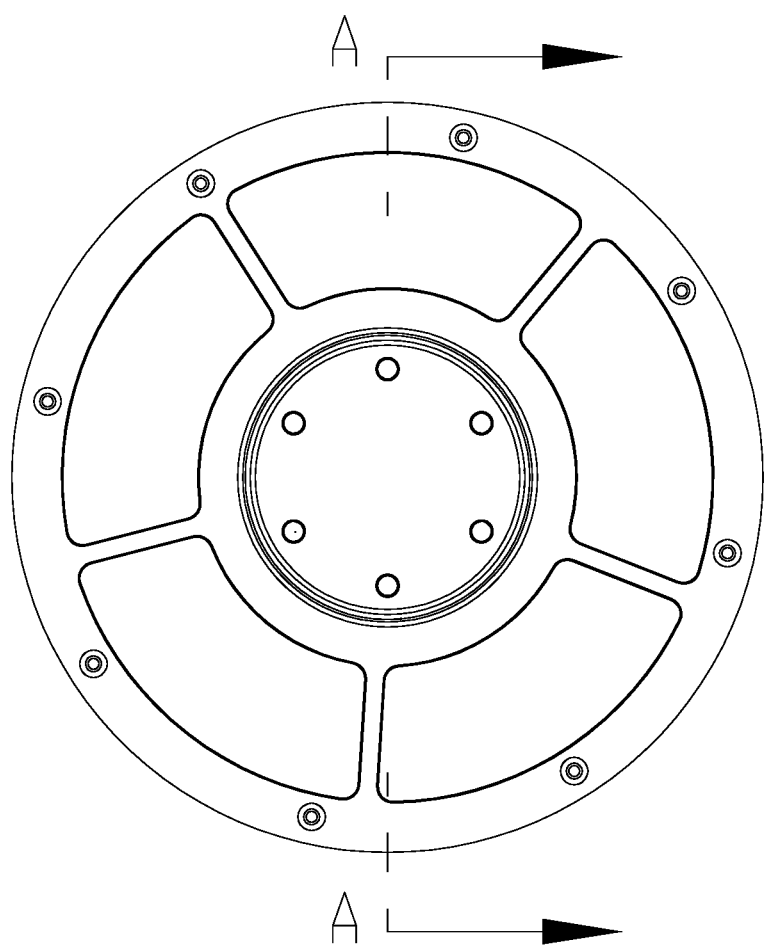
FIG. 4 is a front view of the driving motor according to the invention.
Figure 5:
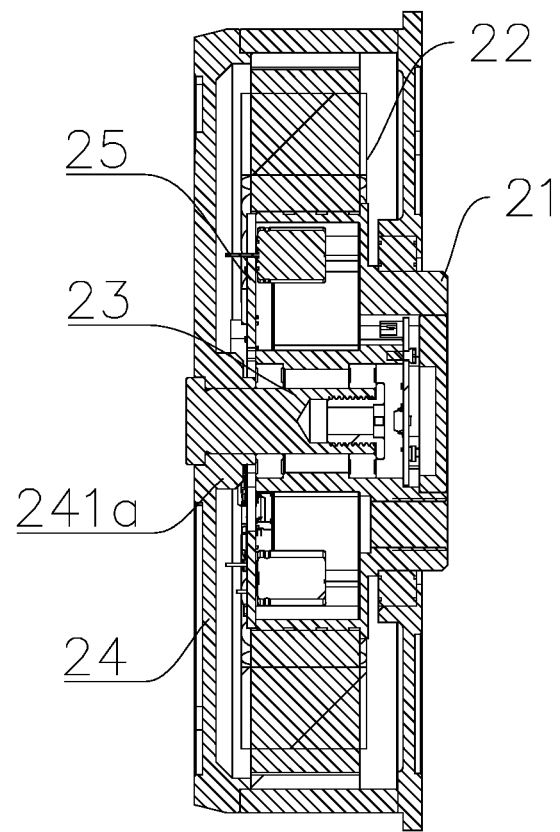
FIG. 5 is a cross-sectional view taken along line A-A in FIG. 4.
Figure 6:
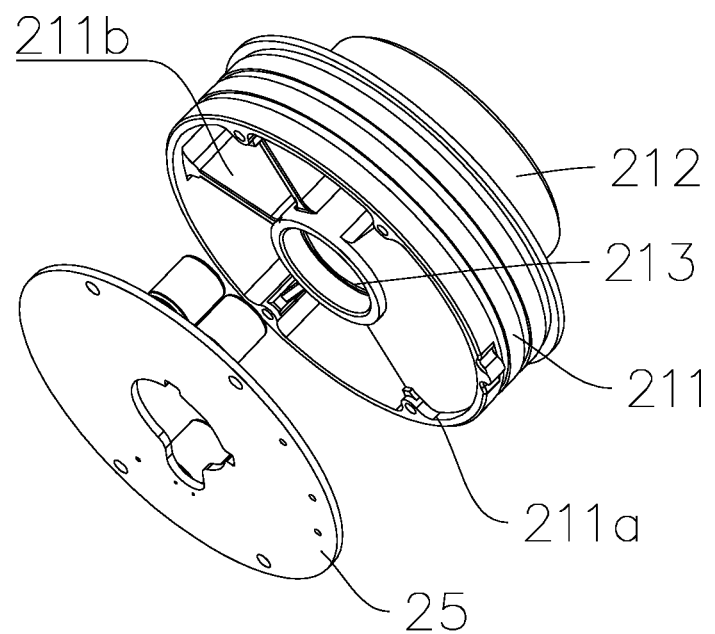
FIG. 6 is a schematic perspective view of a base of the driving motor in FIG. 5.
Figure 7:
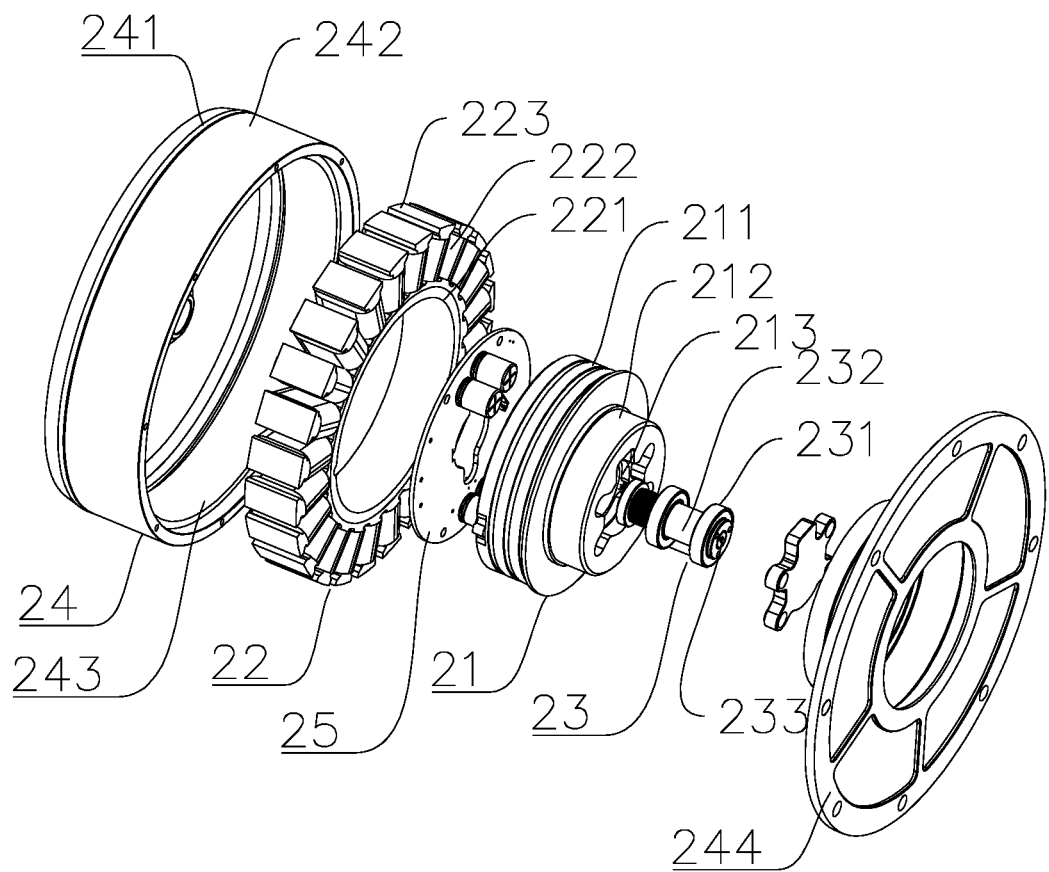
FIG. 7 is an exploded view of the driving motor according to the invention.
Figure 8:
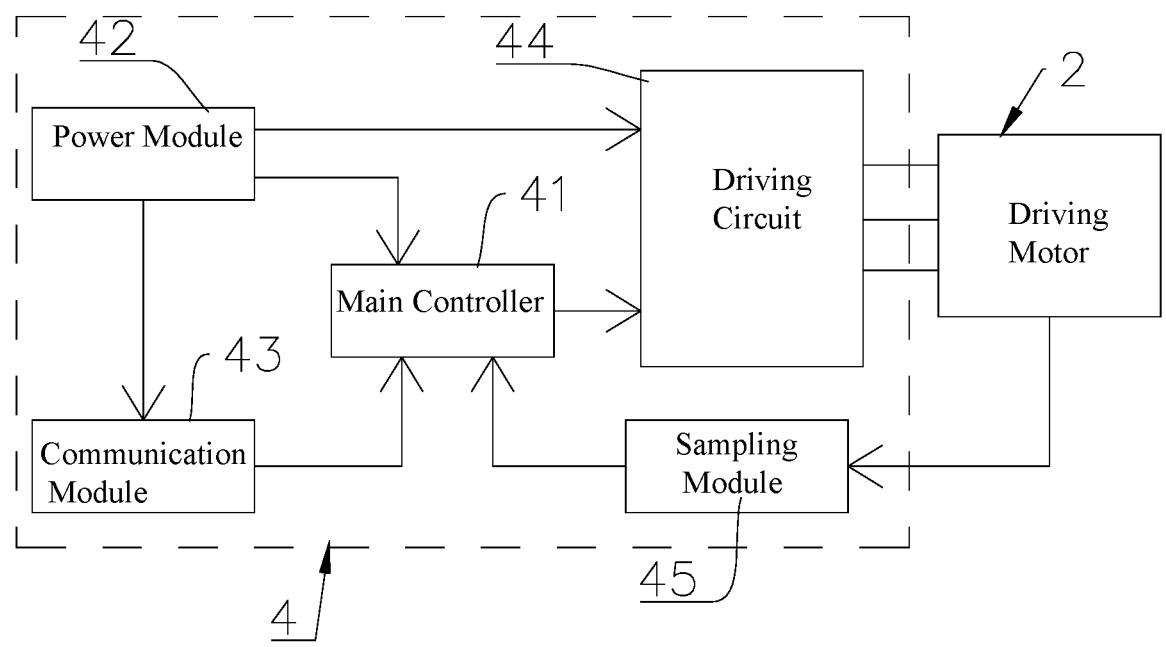
FIG. 8 illustrates a control system according to the invention.
Figure 9:
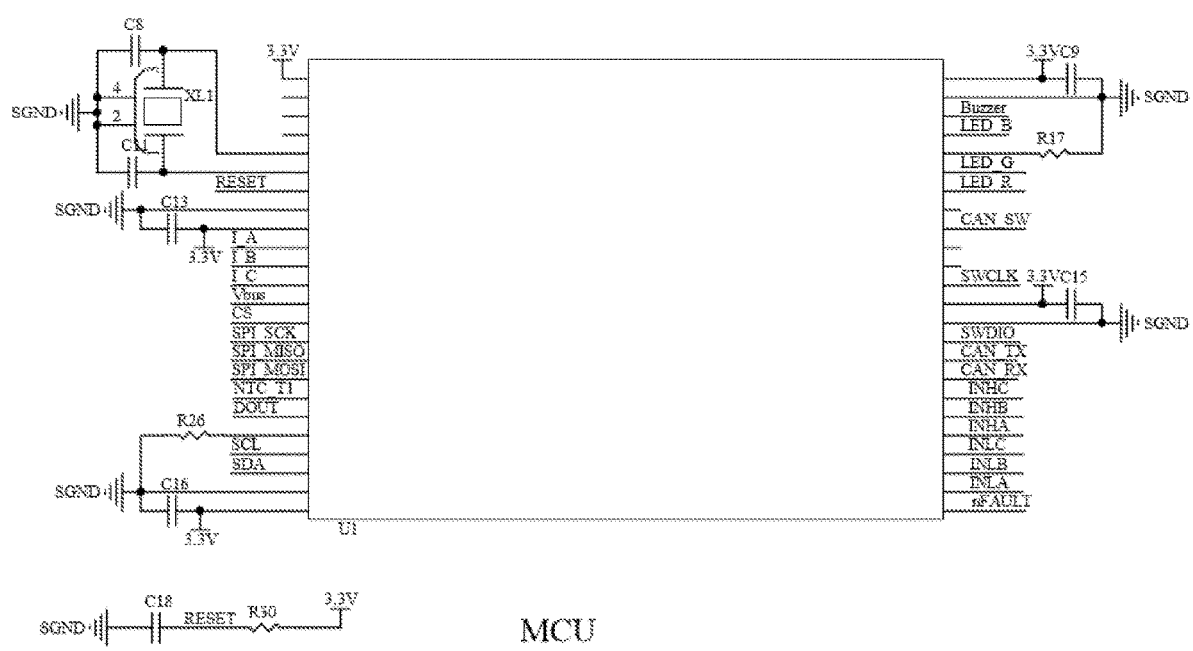
FIG. 9 is a circuit diagram of a main controller of the control system in FIG. 8.
Figure 10:
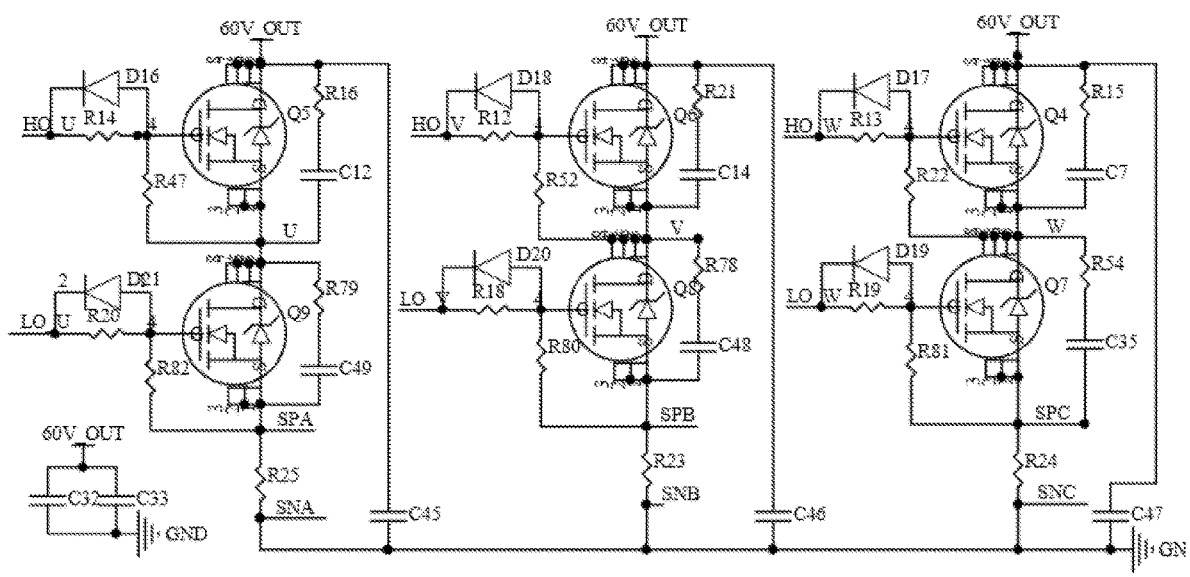
FIG. 10 is a circuit diagram of a driving circuit of the control system in FIG. 8.
Figure 11:
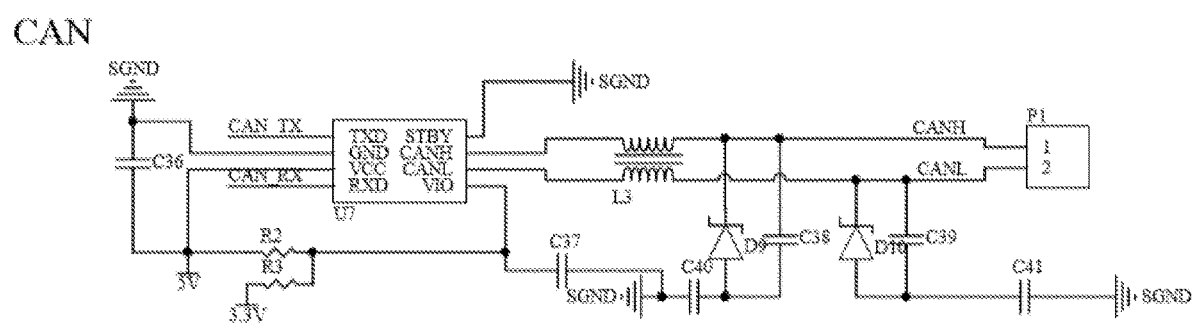
FIG. 11 is a circuit diagram of a communication module of the control system in FIG. 8.

As shown in FIGS. 1-11, a fitness device using two motors for offsetting shakes comprises a box 1, two support frames 11 symmetrically mounted in the box 1, two driving motors 2 mounted on the two support frames 11 and arranged opposite to each other, a pull rope reel 3 connected to the two driving motors 2, a fitness pull rope 31 wound around the pull rope reel 3 and extending out of the box 1, and a control system 4 electrically connected to and used for controlling the driving motors 2. The control system 4 comprises a main controller 41, a power module 42, a communication module 43, a driving circuit 44 and a sampling module 45. The power module 42 is electrically connected to the main controller 41 and the communication module 43, the communication module 43 is electrically connected to the main controller 41, the sampling module 45 is electrically connected to the driving motors 2 and the main controller 41, and the driving circuit 44 is electrically connected to the power module 42, the main controller 41 and the driving motors 2.

The box 1 is provided with a control panel 12, and the control panel 12 is connected to the communication module 43. The control panel 12 can be used for operation control to facilitate operation and is simple and reliable in structure and convenient to use.

Each of the support frames 11 comprises a top plate 111 and a fixing plate 112 mounted on the top plate 111 and extending downwards, and the driving motors 2 are mounted on the fixing plates 112. The driving motors 2 are fixed and mounted by means of the top plates 111 and the fixing plates 112, such that installation is easy, and the structure is stable.

As shown in FIGS. 4-7, each of the driving motors 2 comprises a base 21, a stator assembly 22 arranged on an outer edge of the base 21, a rotary shaft assembly 23 arranged in the base 21, a rotor assembly 24 connected to the rotary shaft assembly 23 and covering the stator assembly 22, and a motor control plate 25 arranged on the base 21, and the motor control plate 25 is connected to the driving circuit 44. During the operating process of the driving motor 2, motor driving is controlled through the motor control plate 25, the rotor assembly 24 and the stator assembly 22 work together to implement the driving process, and the rotary shaft assembly 23 works together with the rotor assembly 24 to realize stable driving in the base 21, such that the driving precision is high.

The base 21 comprises an internal end 211, an external end 212 and a rotary mounting cavity 213 passing through the internal end 211 and the external end 212, the rotary shaft assembly 23 is rotatably mounted in the rotary mounting cavity 213. A mounting stand 211a is arranged at the internal end 211, an internal groove 212a is formed in the external end 212, a convex ring is arranged on an outer edge of the mounting stand 211a, a mounting hole is formed in the convex ring, a plurality of gaps 211b are formed in the mounting stand 211a. Through holes are formed in the external end 212, connected to the gaps 211b and located on one side of the internal groove 212a. The internal end 211 and the external end 212 are used for internal structural installation and external structural connection respectively, and the rotary mounting cavity 213 is used for mounting and fixing the rotary shaft assembly 23, so the installation is easy; and the gaps 211b and the mounting stand 211a work together to install the motor control plate 25, such that the structure is reliable.

The stator assembly 22 comprises an iron core 221 and coils 222 regularly arranged on the iron core 221. The iron core 221 comprises a plurality of teeth 223 regularly arranged in a circumferential direction of the iron core 221. The coils 222 are wound around the teeth 223. An outer circumferential surface of the internal end 211 is provided with a plurality of fastening grooves corresponding to an inner circumferential surface 221 of the iron core 221. The coils 222 are wound around the teeth 223, such that the structure is simple, and the stability is good.

The rotary shaft assembly 23 comprises a bearing assembly 231 mounted in the rotary mounting cavity 213 and a rotary shaft 232 rotatably mounted in the bearing assembly 231. One end of the rotary shaft 232 is connected to the rotor assembly 24, and the other end of the rotary shaft 232 is provided with a fixing element 233. The rotary mounting cavity 213 is provided with a first limit groove and a second limit groove, the bearing assembly 231 comprises two bearings which are mounted in the first limit groove and the second limit groove respectively. The two bearings are used for mounting the rotary shaft 232, such that installation is easy, and the structure is stable.

The rotor assembly 24 comprises an outer end cover 241 connected to the rotary shaft assembly 23, a connecting ring 242 connected to the outer end cover 241 and corresponding to an outer edge of the stator assembly 22, a rotor element 243 mounted on the connecting ring 242 and corresponding to the stator assembly 22, and an inner end cover 244 connected to a side, away from the outer end cover 241, of the connecting ring 242. The inner end cover 244 is rotatably connected to an outer circumferential surface of the external end 212. The outer end cover 241 works together with the connecting ring 242 to realize structural connection, and the rotor element 243 works together with the stator assembly 22 to realize motor driving, such that driving is stable.

The outer end cover 241 is provided with a reinforcing stand 241a, the reinforcing stand 241a is provided with a connecting hole, a limit shoulder is arranged in the connecting hole, and the outer end cover 241 is connected to the rotary shaft assembly 23 through the connecting hole; and the inner end cover 244 is connected to a connecting bearing, and the connecting bearing is disposed around the outer ring of the external end 212. The outer end cover 241 can be connected to the rotary shaft assembly 23 through the reinforcing stand 241a and the limit shoulder, such that connection is easy, and the structure is stable.

The pull rope reel 3 is fixedly connected to the outer end cover 241, and the fitness pull rope 31 is provided with a grip ring 32. Users can operate the fitness pull rope 31 through the grip ring 32, and the structure is stable and reliable.

As shown in FIGS. 8-11, the main controller 41 is an MCU processor, the communication module 43 is a communication interface connected to the control panel 11, and the sampling module 45 is a current sampling module and is used for sampling currents of the driving motors 2. The MCU processor is used as the main controller 41 and cooperates with the communication interface to realize intelligent control, such that the control effect is good, and the intelligent level is high.

The fitness device provided by the invention is a pull fitness device, wherein the fitness pull rope 31 being arranged on the driving motors 2 functions as a pull driver and cooperates with the control system 4 to control the pull force of the driving motors 2, thus realizing smart fitness. In addition, the two symmetrical driving motors 2 are used to drive the pull rope reel 3 to drive the fitness pull rope 31, such that shakes and vibrations generated during exercise can be offset, the load of each motor is reduced, the stability is improved, the overall structure is reliable, and the service life is long. During the control process, the control system 4 receives an input corresponding pull force instruction through the communication module 43, the main controller 41 outputs a corresponding program to the driving circuit 44 through a control algorithm after acquiring the instruction, the driving circuit 44 controls on/off of three-phase currents of the driving motors 2, and then the sampling module 45 continuously compares sampled currents of the driving motors 2 with the input instruction and adjusts the currents continuously until the pull force output by the driving motors 2 reaches the value in the input instruction, such that the pull force can be adjusted freely. Specifically, the fitness device comprises the box 1, the two support frames 11 symmetrically mounted in the box 1, the two driving motors 2 mounted on the two support frames 11 and arranged opposite to each other, the pull rope reel 3 connected to the two driving motors 2, the fitness pull rope 31 wound around the pull rope reel 3 and extending out of the box 1, and the control system 4 electrically connected to and used for controlling the driving motors 2. The control system 4 comprises the main controller 41, the power module 42, the communication module 43, the driving circuit 44 and the sampling module 45, the power module 42 is electrically connected to the main controller 41 and the communication module 43, the communication module 43 is electrically connected to the main controller 41, the sampling module 45 is electrically connected to the driving motors 2 and the main controller 41, and the driving circuit 44 is electrically connected to the power module 42, the main controller 41 and the driving motors 2. The two support frames 11 and the two driving motors 2 are used to fix the pull rope reel 3, and intelligent control of the motors is realized under intelligent control of the control system 4, such that the intelligent level is high.

The above embodiments merely represent several implementations of the invention and are specifically described in detail, but they should not be construed as limitations of the patent scope of the invention. It should be pointed out that those ordinarily skilled in the art can make various transformations and improvements without departing from the concept of the invention, and all these transformations and improvements should fall within the protection scope of the invention. Therefore, the protection scope of the invention patent should be defined by the appended claims.

What is claimed is:

1. A fitness device using two motors for offsetting shakes, characterized by comprising a box, two support frames symmetrically mounted in the box, two driving motors mounted on the two support frames and arranged opposite to each other, a pull rope reel, a fitness pull rope wound around the pull rope reel and extending out of the box, and a control system electrically connected to and used for controlling the driving motors, wherein the two driving motors are symmetrically connected at two opposite ends of the pull rope reel to drive the pull rope reel to drive the fitness pull rope; and wherein the control system comprises a main controller, a power module, a communication module, a driving circuit and a sampling module, the power module is electrically connected to the main controller and the communication module, the communication module is electrically connected to the main controller, the sampling module is electrically connected to the driving motors and the main controller, and the driving circuit is electrically connected to the power module, the main controller and the driving motors.

2. The fitness device using two motors for offsetting shakes according to claim 1, wherein the box is provided with a control panel connected to the communication module for operation control to facilitate operation.

3. The fitness device using two motors for offsetting shakes according to claim 1, wherein each of the support frames comprises a top plate and a fixing plate mounted on the top plate and extending downwards, and the driving motors are mounted on the fixing plates.

4. The fitness device using two motors for offsetting shakes according to claim 3, wherein each of the driving motors comprises a base, a stator assembly arranged on an outer edge of the base, a rotary shaft assembly arranged in the base, a rotor assembly connected to the rotary shaft assembly and covering the stator assembly, and a motor control plate mounted to the base and connected to the driving circuit.

5. The fitness device using two motors for offsetting shakes according to claim 4, wherein the base comprises an internal end, an external end and a rotary mounting cavity passing through the internal end and the external end, the rotary shaft assembly is rotatably mounted in the rotary mounting cavity, a mounting stand is arranged at the internal end, an internal groove is formed in the external end, a convex ring is arranged on an outer edge of the mounting stand, a mounting hole is formed in the convex ring, a plurality of gaps are formed in the mounting stand, and through holes are formed in the external end, connected to the gaps and located in a side of the internal groove.

6. The fitness device using two motors for offsetting shakes according to claim 5, wherein the stator assembly comprises an iron core and coils regularly arranged on the iron core, the iron core comprises a plurality of teeth regularly arranged in a circumferential direction of the iron core, the coils are wound around the teeth, and an outer circumferential surface of the internal end is provided with a plurality of fastening grooves corresponding to an inner circumferential surface of the iron core.

7. The fitness device using two motors for offsetting shakes according to claim 6, wherein the rotating shaft assembly comprises a bearing assembly mounted in the rotary mounting cavity and a rotary shaft rotatably mounted in the bearing assembly;
one end of the rotary shaft is connected to the rotor assembly, and a fixing element is mounted at the other end of the rotary shaft; and
the rotary mounting cavity is provided with a first limit groove and a second limit groove, and the bearing assembly comprises two bearings which are mounted in the first limit groove and the second limit groove respectively.

8. The fitness device using two motors for offsetting shakes according to claim 7, wherein the rotor assembly comprises an outer end cover connected to the rotary shaft assembly, a connecting ring connected to the outer end cover and corresponding to the stator assembly, and a rotor element mounted on the connecting ring and corresponding to the stator assembly, an inner end cover is connected to a side, away from the outer end cover, of the connecting ring, and the inner end cover is rotatably connected to an outer circumferential surface of the external end.

9. The fitness device using two motors for offsetting shakes according to claim 8, wherein the outer end cover is provided with a reinforcing stand, the reinforcing stand is provided with a connecting hole, a limit shoulder is arranged in the connecting hole, and the outer end cover is connected to the rotary shaft assembly through the connecting hole;
the inner end cover is connected to a connecting bearing, the connecting bearing is disposed around the outer circumferential surface of the external end; and
the pull rope reel is fixedly connected to the outer end cover, and the fitness pull rope is provided with a grip ring.

10. The fitness device using two motors for offsetting shakes according to claim 2, wherein the main controller is an MCU processor, the communication module is a communication interface connected to the control panel, and the sampling module is a current sampling module and is used for sampling currents of the driving motors;
during a control process, the control system receives an input instruction corresponding to a pull force through the communication module, the main controller outputs a corresponding program to the driving circuit through a control algorithm after acquiring the input instruction, the driving circuit controls on/off of three-phase currents of the driving motors, the sampling module continuously compares sampled currents of the driving motors with the input instruction, and adjusts the currents continuously until a pull force output by the driving motors reaches the pull force of the input instruction, such that the pull force of the driving motors can be adjusted.

* * * * *